United States Patent [19]

Sohrwardy

[11] 3,920,965

[45] Nov. 18, 1975

[54] METHOD AND APPARATUS FOR PREDICTIVE CONTROL

[75] Inventor: Munir Sohrwardy, Bochum, Germany

[73] Assignee: Siemens Aktiengesellschaft, Munich, Germany

[22] Filed: Mar. 4, 1974

[21] Appl. No.: 447,994

[30] Foreign Application Priority Data
Oct. 3, 1973 Germany.................... 2349725

[52] U.S. Cl. ............................... 235/150.1
[51] Int. Cl.² ................ G05B 13/02; G06F 15/46
[58] Field of Search ................. 235/150.1, 151.1

[56] References Cited
UNITED STATES PATENTS

| | | | |
|---|---|---|---|
| 3,096,471 | 7/1963 | Taylor | 235/150.1 UX |
| 3,225,179 | 12/1965 | Chestnut et al. | 235/150.1 |
| 3,460,096 | 8/1969 | Barron | 235/150.1 UX |
| 3,767,900 | 10/1973 | Chao et al. | 235/151.1 |

*Primary Examiner*—Malcolm A. Morrison
*Assistant Examiner*—Jerry Smith
*Attorney, Agent, or Firm*—Kenyon & Kenyon Reilly Carr & Chapin

[57] ABSTRACT

A method of selecting one of two opposite constant control quantities for use in a control system of a higher order in which a fast control system model is used continuously to complete at least two test runs and to select as the control quantity the one which led to the smallest error of the simulated control error vector in the test runs.

9 Claims, 7 Drawing Figures

METHOD AND APPARATUS FOR PREDICTIVE CONTROL

BACKGROUND OF THE INVENTION

This invention relates to control systems in general, and more particularly to an improved predictive control which utilizes a control loop model which reacts at a speed considerably faster than that of the system to be controlled.

Control systems such as this in which two opposite, constant control signals are selectively activiated for the control loop and the control model have previously been developed for applications where control loops tending to oscillations must be controlled optimally with respect to time. One such system is disclosed in "Proceedings of the Institution of Electrical Engineers" vol. 115, No. 10, Oct. 1968, p. 1568 to 1576 in an article entitled "Simple predictive controller for highorder systems" by J. Billingsley et al. In the control system described therein, the strategy of operation resides in monitoring the difference between the sign of a control signal entered into the control loop model and the simulated control quantity along with their time derivatives and, if a difference generally exists, at least at times, to provide this control signal to the control system. In the case where the signs of this control signal and that of all derivatives of the control quantity agree then the opposite control signal is fed to the control loop. In order to prevent chattering with this method, that is, a practially infinite number of opposite control signals in rapid succession with corresponding small overshoots of the controlled variable over the pre-set reference value, a calculated mismatch between the control loop and the control model must also be provided. The primary disadvantage of this previously described arrangement would appear to be that the criteria for determining the correct control signal for the control loop must be determined in a relatively complicated manner and in particular, the number of control steps must be adapted to the order of the control system in each case.

Thus, it can be seen that there is a need for an improved predictive control system of this nature in which the correct control signal for the control system utilizes a simpler criterion and which system is universally applicable using the same process steps for control systems of any order.

SUMMARY OF THE INVENTION

The present invention provides such an improved system in which test runs are continuously carried out on the control loop model using both control signals in order to determine a control system control quantity, which control signal will cause an output of a corresponding control quantity for the control system which will lead to the smallest magnitude of the simulated control error vector in the test runs. Thus, it is the basic idea of the present invention to use, as the quality criteria, the magnitude of the control error vector which is defined as the difference between a preset reference value vector and the state vector of the control variable.

Since the absolute magnitude of the difference of the control error vector resulting from inputs of opposite control signals is particularly pronounced for extreme values of the control error vector and is thus, more recognizable, a further embodiment of the invention provides:

a. that in two test runs of the model the one and the other control signals are used to determine first extreme values of the control error vector magnitude, both based on the same value of actual control error vector, and these are stored and compared with each other;

b. the control loop model is reset to the original value, is briefly driven first with the control signal that in the first test runs led to the larger extreme value, and is then supplied in a third test run with the other control signal, to obtain a further extreme value of the control error vector magnitude;

c. the third extreme value is compared with the smaller extreme value from the first two test runs and, if the extreme value determined in the third test run is larger, the control quantity associated with the smaller extreme value from the first two test runs is provided to the control system and otherwise the opposite control quantity is provided.

Essentially, what is being done is to use two test runs to predict which of the two opposite control quantities will, over a period of time, lead to the smallest error. However, it is recognized that in some cases, the smallest error will be reached by using one control quantity for a short time and then switching to the other control quantity. Thus, the third test run tests out this possibility. It should be noted that the test runs assume the control quantity which is being supplied will be operative over a fairly large period of time. However, it must be recognized that in actuality, the test runs are being continuously made and the control quantity being supplied to the control system continuously updated. For this reason, the third test run is beneficial in obtaining indications as to which control signal will result in reducing the error to zero in the shortest possible time. In some control loops it is possible to indicate by observing the instantaneous position of the control error vector or one or more of its components which of the two available control signals will more probably make the control error reach zero. In such systems, the method of the present invention can be abbreviated according to a further embodiment of the invention by determining a control signal associated with a faster change of control error prior to the start of the first test run and, if it leads to a smaller extreme value of the control error vector magnitude in one of the first two test runs, providing a corresponding control quantity to the control system. In this connection, it has been found advantageous if, according to a further embodiment of the present invention, the control signal is determined by considering the sign of the error signal and/or at least one of its derivatives with respect to time.

Disclosed is a particularly simple arrangement for implementing the method according to the present invention which includes the following:

a. a sample and hold circuit for storing the components of the control error vector and providing the stored value to the setting inputs of the control loop model;

b. a three-level control element having its output connected to the setting input of the control loop model;

c. a squaring device associated with each component output of the control loop model and a summing stage for adding the output voltages of the squaring devices with the summing stage having its output signal connected to a comparator and means to couple the summing stage output selectively to the input of one of two storage devices;

d. a stepping device for operating the hold element and the three-level control element and for switching the output of the summing stage with the various stages of the stepping device advanced by the output signal of a clock or the comparator.

DETAILED DESCRIPTION OF THE PREFERRED EMBODIMENT

Figure 1:
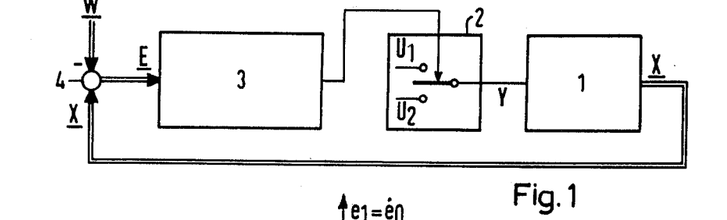
FIG. 1 is an overall block diagram of the system of the present invention.

FIG. 1 shows in simplified block diagram form a predictive control system according to the present invention. In this control system either the control variable $U_1$ or the opposite control variable $U_2$ can be selectively connected as the control quantity Y being provided as an input to a controlled system 1. This is accomplished through the action of the switch designated 2. If a positioning motor is the control element within block 1, the quantity $U_1$ would, for example, cause the positioning motor to run clockwise at maximum speed and the quantity $U_2$ cause the motor to run counterclockwise at maximum speed. As illustrated, the switch 2 is operated by the output signal of a predictive control device designated 3 such that the error vector E fed to it on the input side approaches zero as quickly as possible. The error vector is formed in a summing means 4 and represents the difference between the state vector X of the control value and a preset reference vector W. The components of these vectors form the corresponding quantities and their higher derivatives with respect to time. Thus, in the case of a positioning control, the position, velocity, acceleration and possibly the derivative of acceleration known as "jerk" would make up the various vector components. Within the predictive control device 3 there is contained, among other things, a model of the controlled system 1 which can be fed with control signals $u_1$ and $u_2$ which correspond to the control variables $U_1$ and $U_2$. However, this model is designed so that all time parameters of the controlled system are reduced in the model by the same factor, usually in the order of 100 to 1000 times.

Figure 2:
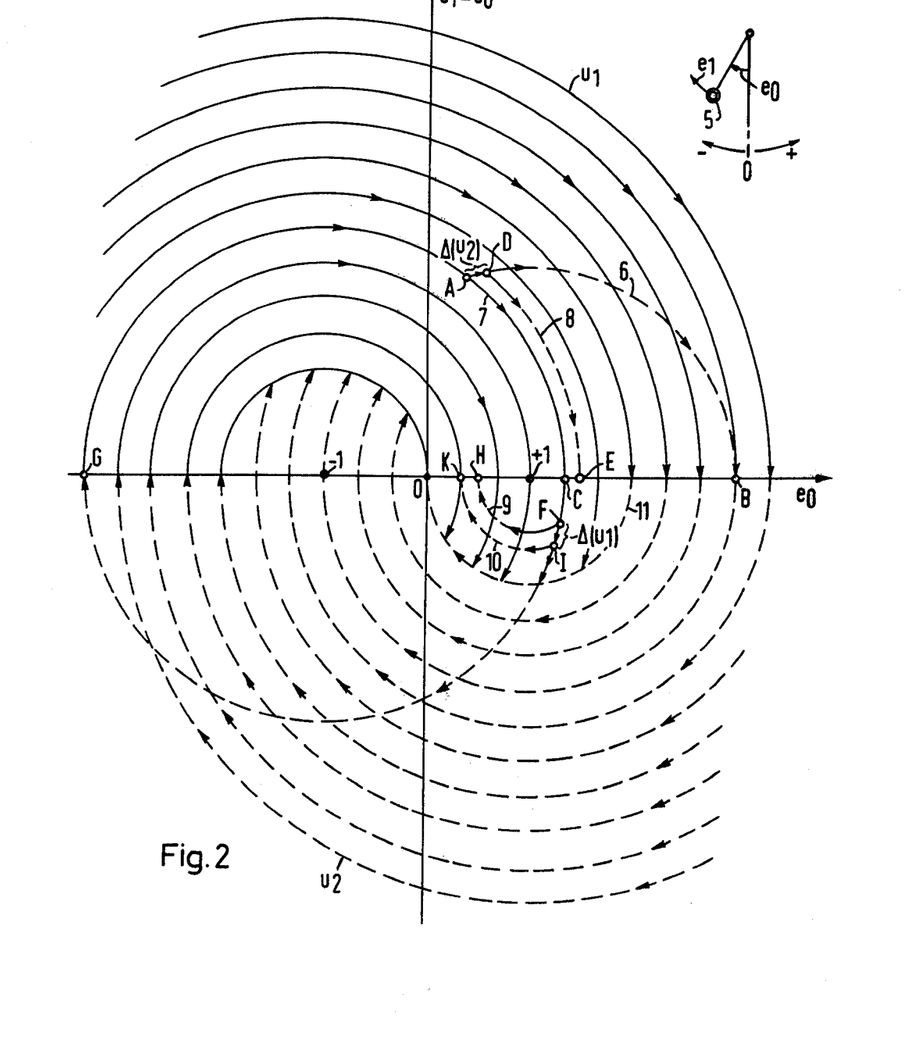
FIG. 2 is an illustration of a simple pendulum system and its associated phase plane plot.

FIG. 2 illustrates the application of the selection of control signals according to the present invention to a simple pendulum system for purposes of illustration. Illustrated in the upper-right hand portion of the figure is an oscillating pendulum which is to be stabilized in a rest position designated O by the action of two opposite, constant positioning forces. Since all the components of the vector of the desired value are zero, the components of the state vector of the controlled system, i.e., the pendulum, will be that of the control error vector. In the example of FIG. 2, there are the excursion $e_o$ of the pendulum model 5 and its instantaneous velocity $e_1 = de_o/dt = \dot{e}_o$. To illustrate the steps of the present invention, the phase plane of FIG. 2 is used. In the direction of the abscissa of the coordinate system the excursion of the pendulum is plotted and, in the ordinate direction, its associated velocity. For simplification in the present example, air friction and other interfering forces are neglected, so that after the pendulum has been deflected its motion can be described, considering only the force of gravity acting on it, by a circle of constant diameter about the origin O of the coordinate system. This circle is traversed in the clockwise direction. In carrying out the steps of the present invention, it is desired, through proper activation of positioning forces acting in opposite directions, to cause the state or control error vector described by the components $e_o$ and $e_1$ of the pendulum to approach zero as quickly as possible or to at least be brought close to the origin O of the coordinate system. In principle, motion along circles having as their center (−1/0) would, according to the model, occur under the influence of control force $u_1$ and motions along circles about the center (+1/0) under the influence of a control force $u_2$. Assume that at a certain time the control error vector has the state A. Its magnitude corresponds to the distance OA. The fast pendulum model is now caused to carry out two test runs successively with the control signals $u_1$ and $u_2$ as inputs and starting from the point A. With the application of the control signal $u_2$, motion along the circular path designated 6 occurs. The first extreme of the magnitude of the control error vector occurs at the point B. Thereafter, the control model is acted upon by the control signal $u_1$ and motion along the circular path 7 occurs with the first extreme being reached at point C. The extreme associated with the point C is smaller than that associated with the point B. Thus, at this point, it would appear that application of the control signal $u_1$ would result in the fastest reduction of the error to zero. However, a further test is first made to insure that this is truly the smallest attainable extreme starting from point A. The third test run is carried out, and the model acted upon by a short time or short distance designated $\Delta(u_2)$ with the control signal $u_2$ as an input again starting from point A. Thereafter, the control signal $u_1$ is applied, causing the system model to follow the circular path 8 from point D onward. It will follow that path reaching the extreme associated with point E which is larger than the extreme value at point C. Thus, the use of the control signal $u_1$ is indicated as the one which will result in reaching a zero value in the shortest possible time. The selection method described above is repeated in rapid succession during the pendulum motion. Nothing will be changed in the result until the controlled system reaches the point C. That is, up until that time, the prediction will indicate that it should be acted upon continuously by the positioning force corresponding to control signal $u_1$.

In some controlled systems, it is possible to predict with a certain degree of confidence, even before making the two test runs, on the basis of a then existing control error vector, which of the two control signals will lead to a smaller magnitude of the control vector error. If this prediction is confirmed after the first two test runs, then it can be immediately supplied to a control system and the third test run is eliminated. Under such conditions, it is possible to confirm the prior predicted control signal by operating the control loop model only for a brief interval of time, i.e., rather than operating it till extremes are reached, using one and then the other control signal, and comparing the resulting amounts of the control error vector with each other. In this way, it is possible to additionally shorten the running time of the model and more rapidly update the desired positioning signal for the controlled system. It should be noted, however, that differences of magnitude of the control error vector are considerably more pronounced at the extremes and are therefor better distinguishable at these points than at points before reaching the extremes.

Returning to the example of FIG. 2, as described above, up until the point C is reached, the control signal $u_1$ will be predicted and used. After passing the abscissa axis, starting, for example, at point F, two test runs will be made with the control signal $u_2$ resulting in motion along the circular arc 9 and the control signal $u_1$ in motion along the circular arc 7. The first extremes reached are situated at points H and G respectively. In the manner described above, the smaller extreme associated with point H is checked in a third test run to see whether or not it is really the smallest possible attainable extreme. This is done by applying the control signal $u_1$ for a small distance $\Delta(u_1)$ along the circular arc 7, and then applying the control signal from the point I with the control variable $u_2$. The result of this third test run is an extreme designated by K, which is smaller than the smaller extreme from the first two test runs. That is, it is smaller than the extreme H. As a result, the force $u_1$ is still applied to the pendulum. The predictions obtained by this test run will continue to be the same until the circular arc 11 is reached. At that point, application of only the force corresponding to the control signal $u_2$ will result in motion to the origin. Thus, at this point, the force corresponding to signal $u_2$ will be applied until the origin is reached, which origin corresponds to the O position of the pendulum. Thus, it can be seen that through this scheme the pendulum is brought to its resting point in the shortest possible time by causing its control error vector to be brought to the origin of the curve as quickly as possible. If in the example of FIG. 2 the control signal which has a sign opposite from that of the error quantity $e$ is presumed to be the one which will lead to the smaller control error vector magnitude, this control signal will then also always cause a more rapid change of the error magnitude. This signal which is designated $u_s$ and also as the "faster" signal and is the signal for which the condition $u_S = -$ sign $e_o$ applies. It would be equal to the control signal $u_1$ where the control error vector is located in the right-hand half of the phase plane and equal to the control signal $u_2$ where the control error vector is located in the left-hand path of the phase plane. From the above discussion and from the figure, it is evident that in the first and third quandrants, this signal $u_S$ can be selected as a preferred signal and the prediction scheme carried out using only two test runs to confirm its preselection. However, in the second and fourth quadrants, such prediction is not as accurate and three test runs are required. Thus, in any given system, if a preferred signal can be determined, only two test runs are required, whereas if it is not possible to determine such a preferred signal, three test runs are always required.

Thus, in the example given above, a coarse estimate of the control process can be obtained depending on the starting point, i.e., the starting position of the control vector. Although the control method described above was described in terms of a two-dimensional state vector, it will be recognized that a state vector of greater dimensions moving about in multi-dimensional space can be handled with no change required in the number of test runs or in the process steps.

Figure 3:
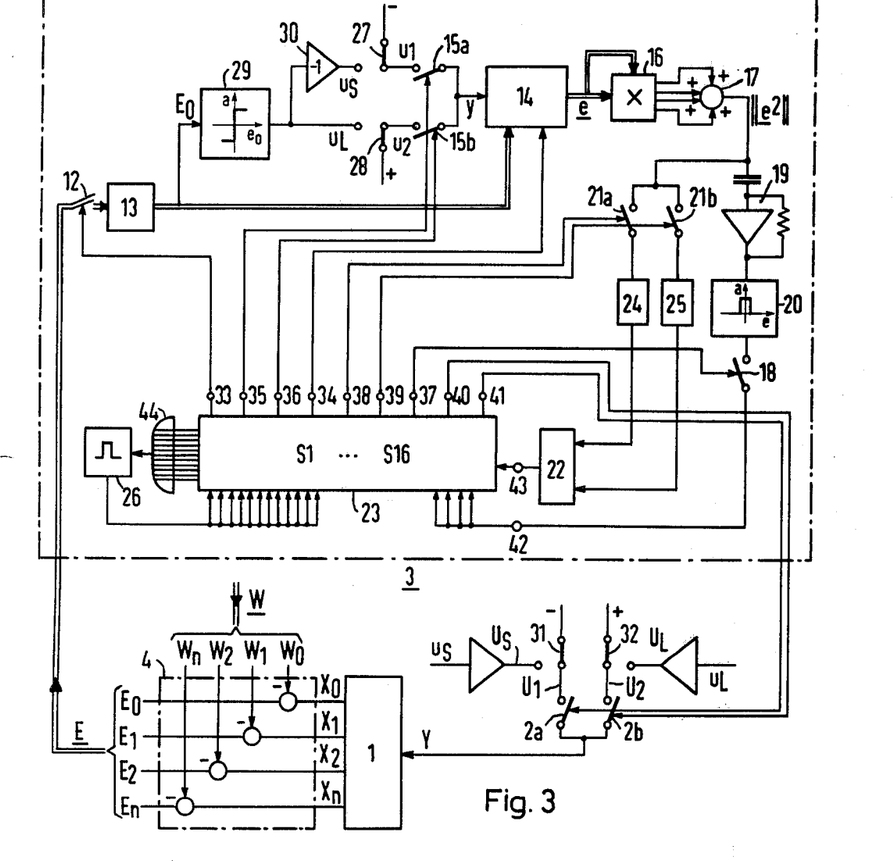
FIG. 3 is a more detailed block diagram of the system of the present invention.

FIG. 3 illustrates, in more detailed form, a block diagram of the system of the present invention. The controlled system, designated by block 1 and driven in response to a signal Y developed in accordance with the present invention as will now be described, is a system in general terms of the $(n+1)^{th}$ order having a state vector consisting of the control variable $X_o$ and, for example, its $n$ derivatives with respect to time, that is, $X_1 = dX_o/dt; \quad X_2 = d^2X_o/dt^2 \ldots X_n = d^nX_o/dt^n$ These are summed with the corresponding components $W_o$ to $W_n$ of a reference value vector W. The result of this summation is the control error vector designated E having the components $E_o$ to $E_n$. These components are provided through a switch 12 to a sample and hold circuit 13 which has its output coupled as the input to a fast control loop model 14. The fast control loop model 14 is acted upon by a control variable $y$ corresponding to the control variable Y which will act on the controlled system. The control variable $y$ can assume either the constant value $u_1$ or the constant value $u_2$, depending on the positioning of switches 15a and 15b, with each of the values $u_1$ and $u_2$ being associated with a given direction of motion. As illustrated on the figure, these two values will generally comprise voltages of equal constant magnitude and opposite polarity. Similarly, the control values $U_1$ and $U_2$ which are provided through switches 2a and 2b as the control input Y to the controlled system will also be equal and opposite voltages. At the output of the control loop model 14 will appear the simulated control error vector $e$ in the form of its individual components, which individual components are then squared in a squaring device 16 which is made up of multipliers or function generators as will be described in more detail below. The squares of the individual components are then summed in a summing stage 17 which may, for example, be a summing amplifier to provide an output which is representative of the magnitude of the vector $e$. The output of the summing stage 17 is provided to an extreme value detector which comprises a differentiator 19 and a limit detector 20, such as a zero crossover detector, the combination of which will provide an output signal each time and for as long as the square of the magnitude of the control error vector remains constant. Note, that according to the well-known rules of calculus, by setting the differential equal to zero, a maximum can be found. Essentially what occurs in this circuit is that through the use of the differentiator and a zero crossover detector, this maximum point is being determined. As will be more fully described below, either the quantity $u_1$ or the quantity $u_2$ will have been provided as the input $y$ to the control system model to result in an output from the detector 20 after a period of time. This will result in a pulse output from the detector 20 which will cause a stepping device 23, to be described in detail below, to cause the output of the summing stage 17 to be switched to one of the inputs of the storage devices 24 or 25 for storage therein. Thus, after one test run, one of the storage devices 24 or 25 will have stored therein the extreme value corresponding to the application of one of the control values $u_1$ or $u_2$. After two or more runs, values will be stored in both storage devices 24 and 25. As shown, there is also a comparator 22 provided, having its inputs coupled to the outputs of the two storage devices 24 and 25 and which from its output at terminal 43, also influences the operation of the stepping device 23. The stepping device is advanced either as a function of the output signal of the limit detector 20 or by means of a clock 26, which is caused to advance by certain output signals of the individual stages S1 to S16 of the stepping device 23 through an OR gate 44. The complete operation of stepping device 23 will be described in detail below. However, before such detailed explanation, the basic steps carried out will be described as follows:

Step 1: Switch 12 is operated and the components of the control error vector E at that particular point in time, sampled and held by the sample and hold device 13;

Step 2: The control loop model 14 is preset with the components of the control error vector stored in sample and hold circuit 13;

Step 3: The control signal input to the model 14 is coupled to the input $u_1$ through the operation of switch 15a and the output of the limit detector 20 is connected to the stepping device 23 through the operation of switch 18. The connection of the output of limit detector 20, which will be at a logical "0" acts as a disabling signal to the stepping device to prevent it from advancing until the detector 20 provides an output pulse at a logical "1".

Step 4: The value of the output voltage at the summing element 23 at the point where a maximum is reached as detected by the detector 20 and in response to which detector 20 provides an output pulse, is stored in the storage device 24 due to operation of the switch 21a;

Step 5: The control loop model is reset to the starting value stored in the sample and hold circuit 13;

Step 6: Switch 15b is closed to cause the control signal $u_2$ to be provided as the input y to the model 14. The output of the limit detector 20 is again connected by means of switch 18 to disable the stepping device 23;

Step 7: Again, when a maximum value is detected at the output of the summing means 17, a pulse is generated by detector 20, the switch 21b closed and that maximum value stored in storage device 25;

Step 8: The control loop model is reset again to the starting values stored in the sample and hold circuit 13. The value stored in storage devices 24 and 25 are compared in the comparator 22 and if it is found that the contents of the storage device 24 is lower than that of storage device 25, step 13 below follows immediately. If, on the other hand, the contents of storage device 24 is of a higher value than the contents of storage device 25, the following occurs;

Step 9: The control loop model 14 is acted upon for a defined short period of time by the control signal $u_1$ through operation of the switch 15a;

Step 10: Switch 15b is closed to cause the control signal $u_2$ to be applied to the control loop model 14 and the output of limit detector 20 connected to the closing of switch 18 to the stepping device 23 to disable it;

Step 11: When a maximum is detected at the output of summing means 17, a pulse from the limit detector 20 causes the maximum value to be stored in storage device 24 through the closing of switch 21a;

Step 12: The contents of the storage device 24 are compared with that of the storage device 25 in comparator 22 and if it is found that the contents of storage device 24 is lower than the contents of storage device 25, the control variable $U_1$ is provided to the controlled system 1 through the operation of switch 2a. If the content of the storage device 24 is higher than the content of the storage device 25, the control variable $U_2$ is connected to the controlled system 1 through the operation of switch 2b;

Step 13: The control loop model 14 is acted upon for a defined short time by the control signal $u_2$ through operation of the switch 15b;

Step 14: Switch 15a is then closed and the control input of the control loop model 14 acted upon by the control signal $u_1$ and the output of the limit detector 20 connected to disable the stepping device 23 through switch 18;

Step 15: When a maximum value of the output of summing means 17 is detected by the limit detector 20 and an output pulse provided therefrom, the maximum value out of summing means 17 is stored in storage device 25 through the closing of switch 21b;

Step 16: The outputs of storage devices 24 and 25 are compared in the comparator 22 and if the contents of storage device 24 is less than the contents of storage device 25, the control variable $U_1$ for the controlled device 1 is transmitted by operation of the switch 2a. If the contents of storage device 24 is higher than the contents of storage device 25, the control variable $U_2$ is transmitted to the controlled system 1 by operation of the switch 2b.

After completion of either step 12 or 16, depending on the results obtained in step 8, the process starts again with step 1.

As will be described in more detail below, the defined short time during which the control loop model 14 is acted upon by one of the control signals $u_1$ or $u_2$ during Steps 10 or 14, can be implemented using a monostable multivibrator or the like, triggered by the stepping device whose output is used to control the switch 15. As an alternate, it is possible to calculate by means of a suitable computing circuit during the steps 9 or 13 the final values which the control loop model would attain if it were acted upon, starting with the starting values stored in the whole element 13 during the defined short time interval by control signals $u_1$ or $u_2$ and then set the control loop model with these final values prior to the start of the Steps 10 or 14.

If the system is amenable to having a "faster" control signal $u_S$ and a "slower" control signal $U_L$ defined in the manner described above, then $u_S$ may be set equal to $u_1$ and $u_2$ set equal to $u_L$ and the stepping sequence abbreviated at Step 9 by the transmission at that point of the control signal $u_1$ or $u_2$ to the controlled system 1. Under these circumstances, if the contents of the storage device 24 is lower than that of the storage device 25, the control quantity $U_S$ corresponding to the control signal $u_S$, is provided to the controlled system 1, and Step 1 restarted. If the preferred "faster" control signal $u_S$ is defined as $u_S = -\text{sign } e_o$ then the arrangement illustrated at the top portion of FIG. 3 may be used. Switches designated 27 and 28 are provided which may be coupled either to positive and negative supplies for operation in the normal manner described above, or to the terminals designated $u_S$ and $u_L$ for the abbreviated mode of operation. A similar arrangement is shown in the lower portion of the figure with switches 31 and 32 being provided for similar purposes, along with amplifiers for amplifying the signals $u_S$ and $u_L$ to $U_S$ and $U_L$ to attain the required magnitude at the input Y of the controlled system. Additionally provided, is a comparator 29 having as an input the signal $E_O$ from sample and hold device 13 which will provide an output at one polarity if $E_O$ is positive and at the opposite polarity if $E_O$ is negative. Thus, its direct output $U_L$ is selected to be negative when $E_O$ is positive and positive when $E_O$ is negative. This output is provided through an inverting amplifier 30 to provide the signal $u_S$ of opposite polarity. Through the coupling of the signals $u_S$ and $u_L$ through the amplifiers to provide the signals $U_S$ and $U_L$ the proper signs will be maintained both at the input to the control system model and at the input to the controlled system. Alternatively, these signals may be obtained by a suitable reversing means corresponding to the means 29 and 30 above, if proper signals can not be obtained simply through amplification of the signals provided at the control loop model input. In the three run method previously described, first two runs are made with each of the opposite control signal inputs being used and then a third run made to check on the first two runs. In the present method where a so-called "faster" signal can be predetermined, the first two control runs are used as a check against this predetermination, thus, eliminating the need for a third run. Thus, $u_S$ is assumed to be the signal which will result in approaching the desired position in the fastest possible manner. If the first two test runs confirm this, this signal is then used as the control input too the controlled system. If, such is not the case, then the full procedure must be carried out to determine which is the best control input signal to be used.

Figure 4A:
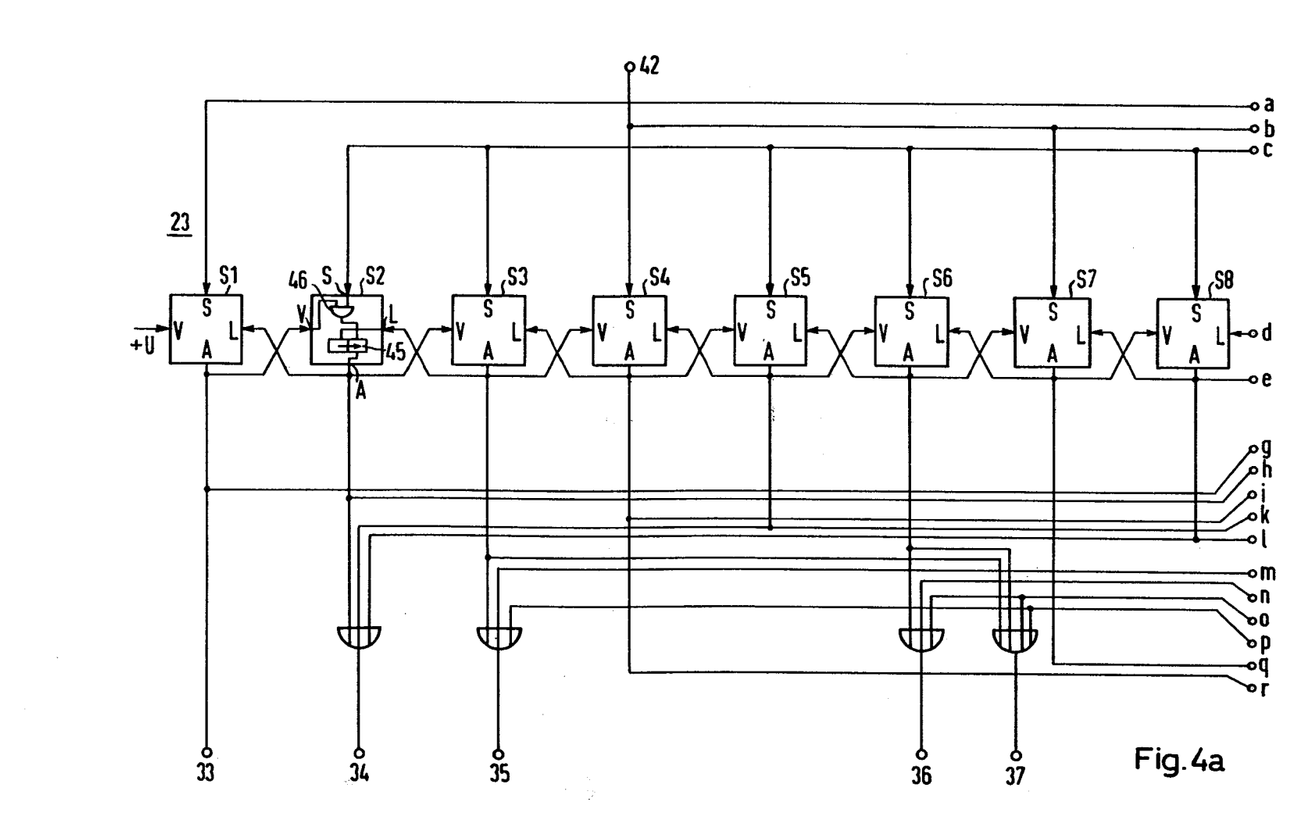
FIG. 4 is a logic diagram illustrating the stepping device of the present invention.
Figure 4B:
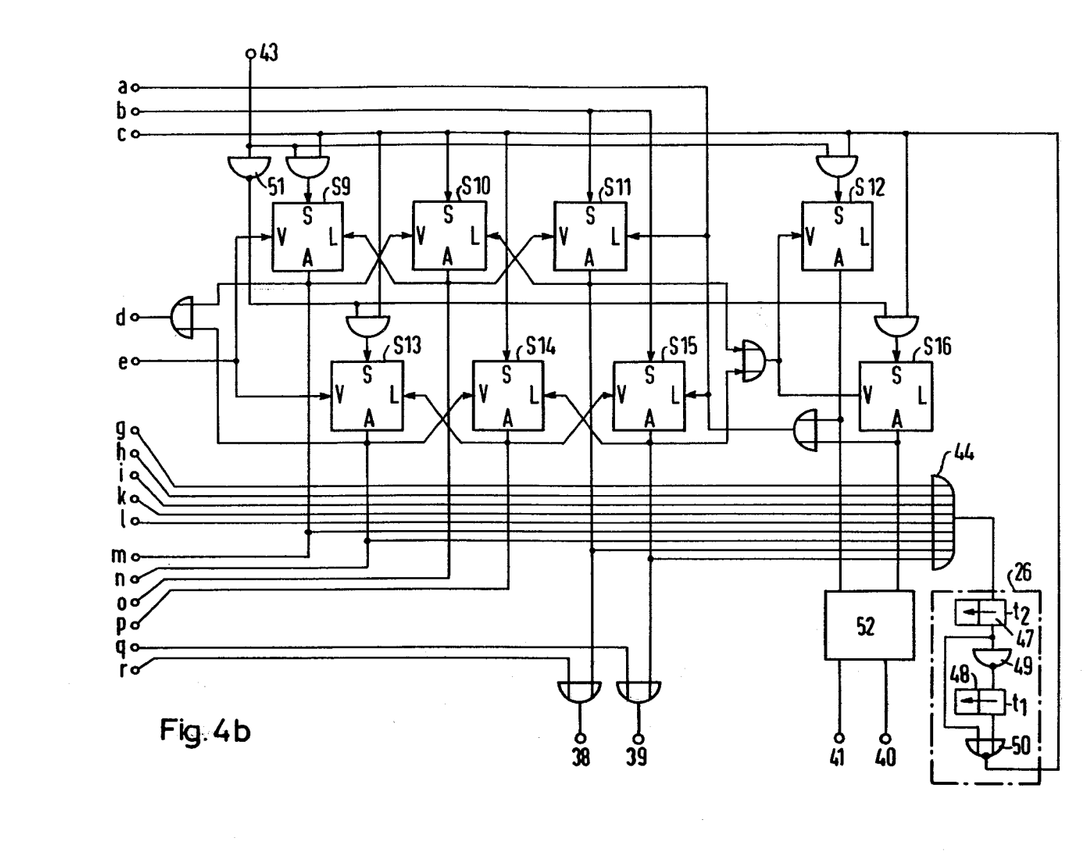

FIG. 4 made up of FIGS. 4a and b is a logic diagram illustrating the construction of the stepping device 23. The stepping device has stages S1 through S16 corresponding to the steps 1 through 16 described above. Each stage comprises, as illustrated by the stage S2, a flipflop 45 having its set input provided through an AND gate 46 to result in each stage having three inputs as follows: an enabling input designated V; a set input designated S; and a reset or clear input designated L. Each of the flipflops also has an output designated A. The stages are cross coupled such that the output of each stage is provided as an enabling input to the next stage and as a reset input to the previous stage. As illustrated, stage S1 is an exception to this rule, being continously enabled by a voltage signal +U. Thus, before any stage may be set, it is necessary that the preceding stage have been set to provide an enabling signal at its input V. Only when both of the V input is at a logical one and at the same time its S input also at a logical one, will a flipflop 45 in any stage be set. Also, as soon as a stage is set in this manner, its output at A is fed back to reset the previous flipflop through the input L. The outputs A of stages S1, S2, S4, S5, S7, S8, S9, S11, S13 and S15 are inputs to an OR gate 44 which provides its output as an input to the clock 26. The clock 26 is made up of two monostable multivibrators 47 and 48 having pulse times $T_1$ and $t_2$ respectively and arranged in series through an invertor 49. The outputs of the two flipflops 47 and 48 are connected to the inputs of a NOR gate 50 whose output signal provides the setting inputs to the stages S2, S3, S5, S6, S8, S9, S10, S12, S13, S14 and S16. The rising edge of a pulse into the clock 26 from any of the stages coupled through the NOR gate 44 will cause the first monostable to go from a logic one to a logic "O" for the time $t_2$, after which its output will return to logical "O" which when inverted through the the NAND gate inverter 49 will cause mono- stable 48 to fire causing its output to go from "0" to "1" for the time period $t_1$, at which point, it will return to "0". Thus, only after the time period $t_1$ plus $t_2$, will two "0"'s be present at the input to NOR gate 50 to cause its output to go from "0" to "1" to set the next stage in line. And, of course, this will only occur if the next stage is coupled to the output of clock 26 and does not apply to the stages S4, S7, S11 and S15 which are controlled by the signal of the limit detector 20. The signal from limit detector 20 is applied to the terminal 42 and is the set input to stages S4, S7, S11 and S15 and will set those stages in response to the occurence of a maximum value as described above. As noted above, the various stages correspond to the above described steps. The output of any stage results in the type of action occuring as described above. In the manner described above the last step will either be step 12 or 16, resulting in a corresponding output from either stage 12 or 16. As shown, these two stages have their outputs connected as inputs to an OR gate 71 which has its output provided as the reset inputs to stages S11 and S15 and also as the set input to stage S1. Thus, at the end of any cycle, the stage S1 is set to restart the cycle. The output of stage S1 at terminal 33 controls the switch 12 of FIG. 3 as indicated. As with the other switches, switch S12 may be an electromechanical switch such as a relay or the like, but will preferable be an electronic switch such as a field effect transistor. When stage 1 is set, it closes theh switch 12, enables stage S2 ans provides an input to the clock 26, which after the delay described above, will provide a set input to stage 2, resulting in that stage being set and stage 1 being reset. The output of stage S2 is provided through an OR gate 72 to terminal 34 which as shown on FIG. 3 is coupled to the control system model 14 and acts to cause the values stored in sample and hold circuit 13 to be set in as initial values. As described above, the output of stages 2 will cause clock 26 to output another pulse after the prescribed delay and will have enabled stage 3 so that, after the time period $t_1$ plus $t_2$, S3 will then be set. The output of S3 is provided through OR gate 73 to terminal 35 and will act to close switch 15a to apply the control signal $u_1$ to the control system model 14. The output will also enable stage S4. Since the clock 26 is not used in setting stage S4 an output from stage S3 is not provided thereto. In the manner described above, the controlled system model will be driven until the limit detector 20 detects a maximum at which point it will output a pulse which is provided at terminal 42. Note that the output of state S3 is also an input to OR gate 74 which provides an output at terminal 37 to close the switch 18 to make the connection between the limit detector 20 and terminal 42. Thus, when the maximum is reached, the pulse at terminal 44 will set stage S4 which was previously enabled by stage S3. The output of stage S4 will also reset stage S3 so that switch 15a is opened resulting in the value as the summing means 17 remaining at the maximum value. The output of stage S4 is also provided through OR gate 75 to terminal 38 to close switch 21a to cause the maximum value at the summing device 17 to be stored in storage device 21. The output of stage S4 also acts on clock 26 to cause, after the above described delay,, stage S5 to be set whereupon stage S4 is reset causing switch 21a to open again. The output of S5 is coupled through the aforementioned OR gate 72 to terminal 34 and will cause the values stored in sample and hold circuit 15 to be used to reinitialize the control system model 14. Stage S5 also operates to activiate clock 26 to cause it, after the predetermined delay, to set stage S6. Stage S6, along with resetting stage S5, will provide outputs through OR gates 74 and 76 to terminals 36 and 37. The output at terminal 36 will close switch 15b and the output at terminal 37 will close switch 18. Control quantity $u_2$ will be applied to the controlled system model until the limit detector 20 again detects a maximum and provides a pulse at terminal 42 which will set stage S7 in turn causing stage S6 to be reset opening switches 18 and 15b. The output of stage S7 is also provides through OR gate 77 to terminal 39 to close switch 21b to cause the output of summing means 17 to be stored in storage device 25. The output of stage S7 also activates the clock 26 which, after the prescribed delay, will cause stage S8 to be set. The output of stage S8 is also connected through the aforedescribed gate 72 to terminal 34 and will cause the initial values stored in sample and hold circuit 13 to be set into the controlled system model as described above. Stage S8 will also initiate a clock cycle to result in a pulse out of clock 26 after a predetermined delay as described above.

From the description above, it will be remembered that this is a point at which the decision is made as to whether to continue with Step 9 or jump to Step 13. In the stepping means 23, this is determined in accordance with the output of comparator 22 appearing at terminal 43. If the value in storage device 24 is lower than the value in storage device 25, comparator 22 will provide a logical "0" signal at terminal 43. If the reverse is true, it will apply a logical "1". The former case with the logical "0" output is an indication that Steps 13 et seq. must be followed. In case of a logical "1", the Steps 9 et seq. are followed. Thus, as illustrated on FIG. 4b, a logical "1" signal at terminal 43 will enable an AND gate 78 at the set input of stage S9. A logical "0" signal at terminal 43 will be inverted in a NAND gate inverter 51 to the output of which will then enable an AND gate 79 coupled to the set input of stage S13. Thus, depending on the comparison made in comparator 22, either stage S9 or stage S13 will be enabled and on the next pulse output from clock 26, in response to stage 8 being set, either stage S9 or stage S13 will be set. If stage S9 is set, its output will be provided through gate 73 and terminal 35 to close switch 15a. If stage S13 is set, its output will be provided through gate 76 and terminal 36 to close switch 15b. Whichever output occurs, it will initiate the clock cycle in clock 26 and after the predetermined delay, the next stage either, S10 or S14, will be set causing the stage S9 or S13 to be reset. Thus, one of the signals $u_1$ or $u_2$ will have been applied to the control system modeel 14 for a predetermined time interval as determined by clock 16. This corresponds to the defined short time referred to in Steps 9 and 13. The outputs of stages S10 and S14 are coupled respectively through gates 76 and 74 to terminals 36 and 35. Both are also coupled to gate 37. Thus, the setting of either of these stages, through gate 74, will cause an output at terminal 37 to close switch 18. An output from gate 73 or 76 will cause one of the switches 15a or 15b to be closed. This switch will remain closed until the limit detector 20 detects a maximum, at which point it will provide a pulse output to terminal 42 to cause either stage S11 or S15 to be set which in turn will cause the stages S10 or S14 to be reset opening switches 18 and 15a or 15b. The outputs of stages S11 and S15 are also connected respectively to OR gates 75 and 77 resulting in an output on either terminal 38 or 39 to cause the maximum value at the summing device 17 to be stored in one of the storage devices 24 or 25 through closure or the switch 21a or 21b. In the manner described above, this value will be stored in whichever of these two previously contained the higher value. As a result, the comparator 22 will have two different values to compare and will provide an output at terminal 43 in accordance therewith. If the storage content of the storage device 24 is still lower than that of the storage device 25, then comparator 22 will still provide a logical "0" output. Conversely, if the storage content of storage device 24 is larger than that of storage device 25, it will provide as an output a logical "1". These outputs at terminal 43 ill enable either AND gate 80 at the input of stage S12 or AND gate 81 at the input of stage S16. The outputs of stages S11 and S15 are connected through an OR gate 83 to the enabling inputs of stages S12 and S16. Thus, on the next pulse output from clock 26 in response to the setting of stage S11 or S15, one of the stages S12 or S16 will be set. Their outputs are connected to a flipflop 52 having its two output terminals designated 40 and 41 coupled to operate respectively the switches 2a and 2b to couple one of the signals $U_1$ or $U_2$ to the input Y of the controlled system 1. Thus, depending on which of the stored values in storage devices 24 or 25 was lower, one of the stages S12 or S16 will be set to cause the proper control signal to be applied to the controlled system. Specifically, if a higher value is in storage device 24 than in storage device 25, stage S12 will be set and a logical "1" signal provided at terminal 41 by flipflop 52 to close switch 2a causing the control voltage $U_1$ to be applied. If the content of storage device 24 is smaller than that of storage device 25, then stage S16 will be set, causing flipflop 52 to provide a logical "1" output at its terminal 40, to close switch 2b to provide the control signal $U_2$ as the input to the controlled device. The switches 15a, 15b, 12, 21a, 21b and 18 may, as noted above, be electronic switches such as field effect transistors. The switches 2a and 2b which must carry larger amounts of current, may be electro-mechanical switches such as relays but will preferably also be electronic switches such as thyristor switches.

Figure 5:
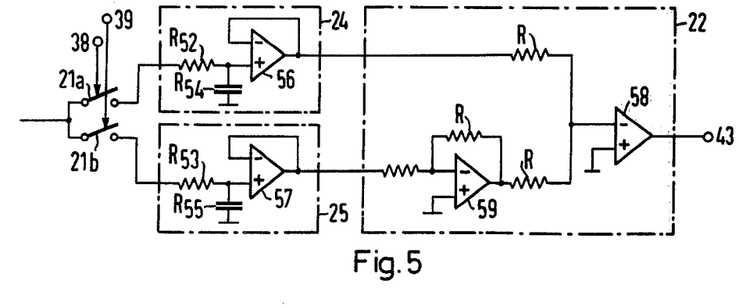
FIG. 5 is a schematic diagram of the means for storing the outputs of the control system model and also shows a comparator.

FIG. 5 is a schematic diagram illustrating a manner of implementing the storage devices 24 and 25 along with the comparator 22. As illustrated, upon closure of one of the switches 21a or 21b, a respective capacitor $C_{54}$ or $C_{55}$ will be charged through its resistor $R_{52}$ or $R_{53}$ to the voltage present at the input, i.e., the voltage obtained from the summing device 17 of FIG. 3. Thus, the desired signal will be stored in one of the respective capacitors. The stored values at the capacitors are coupled through respective operational amplifiers 56 and 57 which serve as impedance transformers to prevent the stored charge in the capacitors from being drained off. The outut of amplifier 56 is connected directly through a resistor R to the inverting input of an amplifier 58. The output of the amplifier 57 is first connected through a unity gain inverting amplifier 59 and theen through a similar resistor R to the same input of amplifier 58. Thus, at the inverting input of amplifier 58, there is a summing junction at which the difference between the two inputs will exist. As will be seen below the signals applied to the capacitors are obtained from an inverting summing amplifier and will have a negative polarity. Thus, if the negative value stored by capacitor $C_{54}$ in storage device 24 is of larger magnitude than that in capacitor $C_{55}$ of storage device 25, a net negative voltage will appear at the input of amplifier 58 resulting in a positive output which corresponds to a logical "1". If the reverse is true and the negative value stored in storage device 25 is larger, the net voltage at the input of amplifier 58 will be positive and a negative or logical "0" output will be provided.

Figure 6:
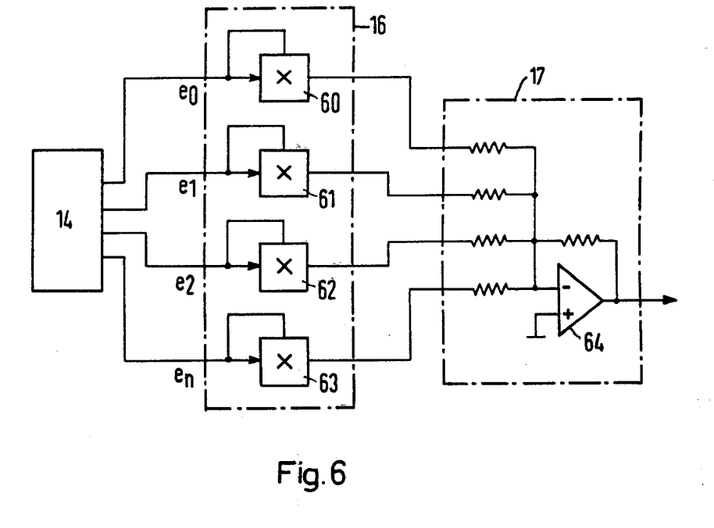
FIG. 6 is a schematic diagram of the squarers and summing means of FIG. 3.

FIG. 6 is a schematic diagram illustrating the arrangement of the squaring means and summing device of FIG. 3. As illustrated, the squaring device 16 consists of a plurality of multipliers designated 60, 61, 62 and 63, one being provided for each component $E_0$ through $E_N$ of the state vector output of the control system model 14. These outputs $E_O$ and $E_N$ are each provided to the two multiplying inputs of the multiplier so that the output thereof will be the square of the input. It will be recognized that instead of using multipliers, appropriate function generators could also be used for squaring. As is well known, such function generators use bias threshold diodes to obtain a squaring function. The outputs so obtained from the multipliers are summed in convention fashion in a summing amplifier 64. Although only four inputs are shown in this example, it will be recognized that the system can be easily adapted to any number of vector components simply by adding an appropriate number of multipliers. Thus, systems of any higher order can be handled in accordance with the present invention.

The construction of the control system model 14 has not been shown in detail herein since in each individual case, it will differ. The construction of such models is based on an actual control system is well known in the art and described in detail in many well-known analog computer texts.

Thus, an improved predictive control system has been shown. Although a specific embodiment has been illustrated and described, it will be obvious to those skilled in the art that various modifications may be made without departing from the spirit of the invention, which is intended to be limited solely by the appended claims.

What is claimed is:

1. A method for the predictive control of a control system using a control loop model which reacts considerably faster than the control system and in which two opposite constant control signals which can be selectively activated are used as inputs of the control system and the control loop model comprising continuously performing test runs on the control loop model using the two opposite control signals in order to select a control variable for the control system which control variable is the one which has led to the smallest magnitude of a simulated control error vector in the test run comprising the steps of:
   a. initializing the control loop model at the value of the actual control vector error;
   b. operating on the control loop model by one of the two opposite control signals until a first extreme value of a control error vector magnitude is determined;
   c. re-initializing the control loop model;
   d. acting on the control loop model with the other control signal until a second extreme value is reached;
   e. storing said first and second extreme values;
   f. comparing said first and second extreme values with each other;
   g. initializing the control loop model to the original value;
   h. acting on the control loop model with the control signal which in the first two runs led to the largest extreme value as determined by said comparison for a short time interval;
   i. acting on the control loop model with the other control signal until an extreme value of the control error vector magnitude is reached to obtain a third extreme value;
   j. comparing the third extreme value with the samller of the extreme values obtained from the first two test runs;
   k. providing the control signal associated with the smaller extreme value from the first two test runs to the controlled system if the third extreme value is larger and the other control signal to the control system if the third extreme value is smaller.

2. The method according to claim 1 and further including the step of selecting a control signal associated with a faster variation of the control signal prior to the first test run and providing said control signal to said controlled system if after the first two test runs said control signal associated with the faster variation results in a smaller extreme value of the control error vector magnitude.

3. The method according to claim 2 wherein said control signal associated with a faster variation is selected as a function of the sign of the control error position and at least one of the the derivatives of said error position with respect to time.

4. Apparatus for carrying out a predictive control in a system using a control loop model which reacts considerably faster than the controlled system and in which two opposed constant control signals are provided which can be selectively activated as inputs to the controlled system and the control system control loop model comprising:
   a. a sample and hold means having as its inputs the components of the actual control error vector and adapted to store said inputs and provide them as outputs;
   b. means for coupling said outputs to said control system model as initial values;
   c. first means for selectively coupling the first and second opposed control signals to said control loop model;
   d. a plurality of squaring means, one being associated with each component output of said control loop model;
   e. summing means having the outputs of each of said squaring means as inputs;
   f. an extreme value detector coupled to the output of said summing means;
   g. first and second storage means;
   h. second means for selectively coupling the output of said summing means to said first and second storage means;
   i. a stepping device including a clock for sequentially operating said sample and hold element, said means for coupling said first and second signals, and said means for coupling the output of said summing means, said stepping device arranged to advance in response to the output signals of one of a clock and said extreme value detector.

5. Apparatus according to claim 4 wherein said extreme value detector includes differentiating means coupled to the output of said summing means and a limit detector having its input coupled to the output of said differentiating means.

6. Apparatus according to claim 4 and further including means for supplying said opposed signal as a function of the sign of the control error position and a derivative of said position error with respect to time.

7. Apparatus according to claim 4 wherein said first and second means for selectively coupling comprise semiconductor switches.

8. Apparatus according to claim 4 wherein said stepping means comprises a plurality of stages, each enabled by a preceeding stage, and reset by a following stage and coupled to be set, when enabled by one of said clock and said extreme value detector the stages further being coupled as follows:
 a. a first stage coupled to be set by a last stage and providing its output to operate the sample and hold circuit and initiate a clock pulse from said clock;
 b. a second stage coupled to be set by said clock and having its output coupled to initialize the control system model and to initiate a clock pulse;
 c. a third stage coupled to be set by said clock and having its output coupled to said first means to cause said first opposed control signal to be provided to said control model and to couple the output of said extreme value detector to said stepping device;
 d. a fourth stage coupled to be set by said extreme value detector and providing its output to said second means to cause the output of said summing means to be provided to said first storage means and to initiate a clock pulse;
 e. a fifth stage coupled to be set by said clock and having its output coupled to re-initialize said control system model and to initiate a clock pulse;
 f. a sixth stage responsive to be set by said clock and providing its output to said first means to cause the second opposed control signal to be provided to said control loop model and to couple the output of said extreme value detector to said stepping device;
 g. a seventh stage coupled to be set by the output of said extreme value detector and providing its output to said second means to cause the output of said summing means to be provided said second storage means and to initiate a clock pulse;
 h. an eight stage coupled to be set by said clock and having its output coupled to reinitialize said control loop model;
 i. a comparator having as inputs the outputs of said first and second storage means;
 j. ninth and thirteenth stages enabled respectively by the output of said comparator and the inverse of said output, each coupled to be set, when enabled, by said clock and having their respective outputs coupled to said first means with the output of said ningh stage being arranged to cause said first control signal and the output of said thirteenth stage to cause said second control signal to be provided to said control loop model and each having their outputs coupled to initiate a clock pulse;
 k. tenth and fourteenth stages coupled when enabled, by a respective one of said ninth or thirteenth stages to be set by said clock each having their outputs arranged to couple said extreme value detector to said stepping device, said tenth stage having its output coupled to cause said first means to provide said second control signal to said control loop model, and said fourteenth stage being coupled to cause said first means to provide said first control signal to said control loop model;
 l. eleventh and fifteenth stages coupled to be set by the output of said extreme value detector when enabled by their preceeding stage with both said eleventh and fifteenth stages providing an output to initiate a clock pulse and said eleventh stage output to cause said second means to provide the output of said summing means to said first storage device and said fifteenth means output to cause said second coupling means to couple the output of said summing means to said second storage means;
 m. twelth and sixteenth stages enabled respectively by the output of said comparator and its inverse and coupled to be set, when enabled, by said clock, said twelth stage being arranged to cause one of said opposed control signals to be provided to the controlled system and said sixteenth stage being coupled to cause the other of said opposed control signals to be rovided to said controlled system.

9. Apparatus for carrying out a predictive control in a system using a control loop model which reacts considerably faster than the control system and in which two opposed constant control signals are provided which can be selectively activated as inputs to the controlled system and the control loop model comprising:
 a. means for developing the components of an actual control vector error by finding the difference of the controlled system state vector and a desired state vector;
 b. means having said error vector components as inputs for sampling and holding said error vector components;
 c. a control loop model having the component outputs of said sample and hold means as an initialzing inputs and adapted to provide component outputs;
 d. means to selectively couple first and second opposed control signals to said control loop model;
 e. a plurality of squaring means, one being provided for each component of the state vector, coupled to respective state vector component outputs of said control loop model;
 f. means for summing the outputs of said squaring means;
 g. an extreme value detector coupled to the output of said summing means;
 h. first and second storage means;
 i. means for selectively coupling the output of said summing means to said first and second storage means;
 j. a comparator having the outputs of said first and second storage means as inputs;
 k. a clock;
 l. stepping means having a plurality of stages coupled for operating said sample and hold means, initializing said control loop model, coupling said summing means outputs to said storage means, coupling the output of said extreme value detector to said stepping means, and for coupling said first and second opposed signals to said control loop model, and further having outputs for initiating said clock to produce clock pulses, said stepping means being responsive at predetermined stages to a pulse output from said clock, the output of said extreme value detector and the output of said comparator;
 m. said stepping device being arranged to sequentially operate said above described means to carry out at least two test runs and further including outputs operable at the end of said test run for coupling one or the other of the two opposed control signals to the controlled system.

* * * * *